(12) United States Patent
Johnson et al.

(10) Patent No.: US 8,328,438 B2
(45) Date of Patent: Dec. 11, 2012

(54) NETWORKED FREEZER STOCKING MANAGEMENT

(75) Inventors: Thomas H. Johnson, St. Paul, MN (US); Carrol E. Johnson, Cambridge, MN (US)

(73) Assignee: Spinnaker Process Instruments, Minneapolis, MN (US)

( * ) Notice: Subject to any disclaimer, the term of this patent is extended or adjusted under 35 U.S.C. 154(b) by 0 days.

(21) Appl. No.: 13/416,859

(22) Filed: Mar. 9, 2012

(65) Prior Publication Data

US 2012/0227423 A1 Sep. 13, 2012

Related U.S. Application Data

(60) Provisional application No. 61/451,513, filed on Mar. 10, 2011.

(51) Int. Cl.
*G03B 17/00* (2006.01)
*G01K 13/00* (2006.01)
*G01G 23/38* (2006.01)

(52) U.S. Cl. .............. 396/427; 396/429; 62/129; 177/2

(58) Field of Classification Search ........ 177/5; 62/129; 396/427, 429
See application file for complete search history.

(56) References Cited

U.S. PATENT DOCUMENTS

| | | |
|---|---|---|
| 790,529 A | 5/1905 | Salo et al. |
| 942,286 A | 12/1909 | Sansbury |
| 1,222,488 A | 4/1917 | Tallman |
| 4,412,292 A | 10/1983 | Sedam et al. |
| 4,553,211 A | 11/1985 | Kawasaki et al. |
| 4,766,548 A | 8/1988 | Cedrone et al. |
| 5,708,223 A * | 1/1998 | Wyss ............ 73/865.9 |
| 6,131,399 A | 10/2000 | Hall |
| 6,315,197 B1 | 11/2001 | Beardsley |
| 6,341,271 B1 | 1/2002 | Salvo et al. |
| 6,385,772 B1 | 5/2002 | Courtney |
| 6,484,901 B1 | 11/2002 | Kim |
| 6,553,336 B1 | 4/2003 | Johnson et al. |
| 6,695,166 B2 | 2/2004 | Long |
| 6,925,335 B2 | 8/2005 | May et al. |
| 7,139,616 B2 | 11/2006 | May et al. |
| 7,188,491 B2 | 3/2007 | Donald, II et al. |
| 7,426,812 B2 * | 9/2008 | Metzger ............ 53/459 |
| 7,965,336 B2 | 6/2011 | Bingle et al. |
| 8,091,374 B2 * | 1/2012 | Chang ............ 62/137 |
| 2008/0025544 A1 | 1/2008 | Maldonado |
| 2008/0249370 A1 | 10/2008 | Birnkrant et al. |
| 2009/0121017 A1 | 5/2009 | Cato et al. |
| 2010/0121482 A1 | 5/2010 | Jackson et al. |
| 2011/0062135 A1 | 3/2011 | Duchayne et al. |
| 2011/0144801 A1 | 6/2011 | Selker et al. |

* cited by examiner

*Primary Examiner* — W. B. Perkey
(74) *Attorney, Agent, or Firm* — Schwegman Lundberg Woessner P.A.

(57) ABSTRACT

A system for an ice merchandiser having a compressor in a compressor enclosure to cool the ice merchandiser includes a sensor disposed within the ice merchandiser, and a communications component disposed within the compressor enclosure and coupled to the sensor to receive signals from the sensor representative of the amount of ice in the ice merchandiser, wherein the communications component is configured to convert the received signals to a digital format and publish the signals via a network connection.

15 Claims, 3 Drawing Sheets

NETWORKED FREEZER STOCKING MANAGEMENT

RELATED APPLICATION

This application claims priority to U.S. Provisional Application Ser. No. 61/451,513 (entitled INTEGRATED NETWORKED ASSET MANAGEMENT, filed Mar. 10, 2012) which is incorporated herein by reference.

BACKGROUND

Managing ice merchandisers to keep them stocked with bags of ice has been performed by drivers of ice trucks, who visit sites and check the ice merchandisers visually to determine whether more bags of ice should be added. This process leads to wasted effort when the ice merchandisers do not need more ice. It also may lead to delay in refilling ice merchandisers and result in lost sales if not refilled quickly enough.

One proposal to begin to address such problems has been to add weight sensors under the ice merchandiser to weigh the entire ice merchandiser. This retrofit solution is not able to offer level information on more than one product inside the merchandiser and its components, all external, may be negatively impacted by adverse weather conditions or subject to tampering or vandalism.

SUMMARY

A system for an ice merchandiser having a compressor in a compressor enclosure to cool the ice merchandiser includes a sensor disposed within the ice merchandiser, and a communications component disposed within the compressor enclosure and coupled to the sensor to receive signals from the sensor representative of the amount of ice in the ice merchandiser, wherein the communications component is configured to convert the received signals to a digital format and publish the signals via a network connection.

In one embodiment, the sensor includes a camera and a heating element proximate a lens of the camera.

In another embodiment, an ice merchandiser is fitted with at least one weight scale that sits in the bottom of the ice merchandiser to measure the weight of ice bags placed upon it. The scale in one embodiment covers substantially the entire floor of the chest. The scale provides an output to a system outside a cooled volume of the ice merchandiser. The system takes the output and provides a signal on a network representative of the weight, and correspondingly, the ice supported by the scale.

In some embodiments, multiple scales may be used in the chest side by side to measure the weight of different sized bags of ice placed upon the scales.

In further embodiments, temperature sensors and contact switches may be coupled to the system to provide signals representative of temperature inside and outside of the chest, as well as whether a chest door is open or not.

The system may provide signal processing to provide signals representative of the sensed parameters to the network. In one embodiment, the system includes a device having an IP address to facilitate exposing the sensed information via a website like interface. A wireless modem may be included.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
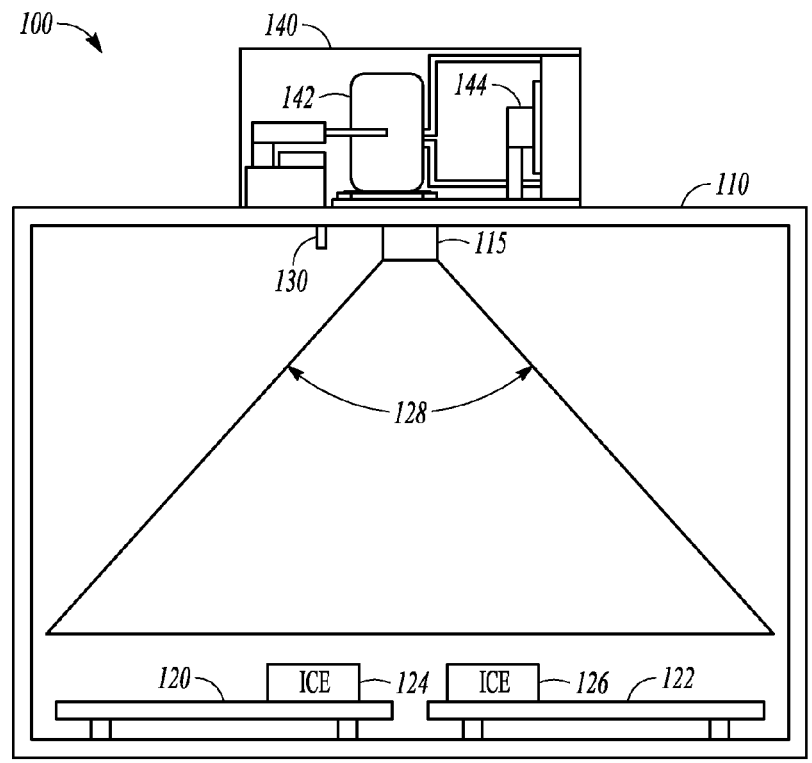
FIG. 1 is a block diagram of a system to detect stocking of ice in an ice merchandiser according to an example embodiment.

FIG. 1 is a block diagram of a system 100 to detect stocking of ice in an ice merchandiser 110 according to an example embodiment. One or more different types of sensors may be placed inside the ice merchandiser 110 in various embodiments. In one embodiment, a sensor includes a camera 115 placed to obtain images, such as still images or video images of items, such as bags of ice placed on one or more platforms 120, 122 inside of the ice merchandiser 110. In one embodiment, platform 120 is used to hold bags 124 of one size, and platform 122 is used to hold bags 126 of a different size.

In one embodiment, the camera has a lens that provides field of view 128 that is wide enough, such as at least 70 degrees in one embodiment that is sufficient to enable someone to determine whether the items need restocking. One or more further sensors may be included, such as a temperature sensor 130 disposed within the ice merchandiser 110 to measure the temperature within the ice merchandiser. Sensor 130 may also include multiple sensors to sense further parameters, such as humidity in further embodiments.

In one embodiment, the platforms 120 and 122 may comprise load cells, forming weight scales that sit in the bottom of the ice merchandiser to measure the weight of ice bags placed upon them. The scales may be used with or without the camera, and the camera may also be used without the scales in various embodiments. In one embodiment, one scale is used that covers substantially the entire floor of the chest and measures the pressure on each of four feet supporting the scale off the floor of the chest. In further embodiments, the scale provides a linear analog output representative of weight. The output may be provided to circuitry either inside, or outside the ice merchandiser 110, such as within a compressor enclosure 140 housing a compressor 142 and fan 144 in various embodiments, where the output may be converted to standardized signal such as a linear zero to five volt signal representative of the weight of ice bags on the scale.

The scale has a low profile such that it does not adversely impact the cooling volume of the ice merchandiser for holding ice bags. The scales are sized to fit within the ice merchandiser, and to ensure that they cover enough of the floor to accurately measure the amount of ice stacked on them. In some embodiments, some space is left between walls of the ice merchandiser and sides of the scale to ensure that the scales are not adversely affected by interference from the wall. The space is also small enough to ensure that bags of ice are properly accounted for by the scale without falling between the scale and walls. Such a sized scale is said to substantially cover a desired portion of the ice merchandiser floor. As can be seen, there is some tolerance permitted.

In some embodiments, multiple scales may be used in the chest side by side to measure the weight of different sized bags of ice placed upon the scales. In an ice merchandiser with two doors, one door may be used for bags of one weight having a first scale, and the other door may be used for bags of a different weight having a second scale. Thus, two weights are provided to the system for publishing via the network connection. In some embodiments, the system may provide alerts regarding a need for restocking one side or the other of the ice merchandiser when the weight falls below a desired level. In various embodiments, the alerts may be provided via text messages, email, voicemail or other mechanisms including various social media. Information regarding the ice merchandiser may be accessible from at least mobile devices, computer systems, and other devices capable of providing information.

Figure 2:
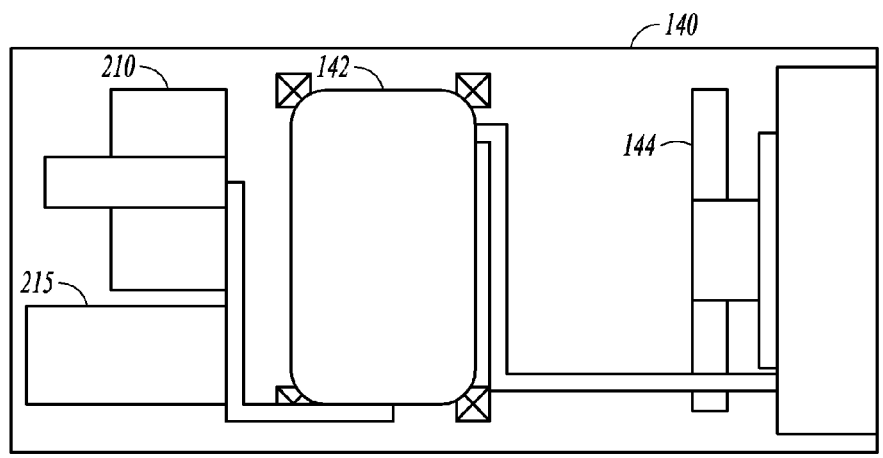
FIG. 2 is a top view of components in a compressor container for the ice merchandiser of FIG. 1.

In further embodiments, temperature sensors and contact switches may be coupled to the system to provide signals representative of temperature inside and outside of the chest, as well as whether a chest door is open or not. FIG. 2 is a top view block diagram of components in the compressor enclosure 140. A compressor electrical enclosure 210 contains circuitry for controlling the compressor and fan, as in standard compressor designs. In some embodiments, sensors are provided to sense temperature within the compressor enclosures 140, external temperature, and compressor power draw. Still further sensors may be included in further embodiments.

A communications enclosure 215 is included, and contains circuitry for controlling the sensors that have been added to the ice merchandiser 110 in various embodiments. The circuitry has an IP address and modem, and provides data to a network such as the Internet, representative of the sensed parameters, such as images, weight, temperature, humidity or other parameters that may be sensed, and correspondingly, the ice supported by the scale. In one embodiment, a web enabled sensor appliance, such as a Maverick IP Sensor Appliance by Mamac Systems, incorporates a web server, analog/digital inputs and relay outputs. The appliance operates with any 24 VAC transformer, and may be plugged into a hub/router. Any web browser can be used to enter the default IP address to receive the data.

Figure 3:
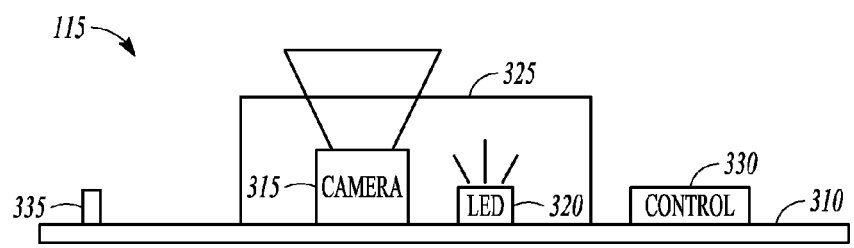
FIG. 3 is a side block diagram illustrating further details of a sensor system within the ice merchandiser of FIG. 1

FIG. 3 is a side block diagram illustrating further details of the sensor 115 within the ice merchandiser 110 of FIG. 1. A circuit board 310 has a camera 315 mounted on it, along with a light emitting diode 320 (LED) near the camera and corresponding lens of the camera. In one embodiment the camera 315 and LED 320 are enclosed in a transparent camera enclosure 325. The camera enclosure 325 may be made of polycarbonate materials in one embodiment, and the volume enclosed may be heated sufficiently by the LED 320 to remove or prevent moister from condensing or freezing on the lens of the camera 315, allowing a clear field of view of the items stocked in the ice merchandiser 110. In further embodiments, the LED 320 may be positioned very close to the lens to obviate the need for the enclosure 325. The proximity of the LED 320 to the camera may thus vary in different embodiments, but should be within a distance to allow it to perform the function of providing a clear field of view. In addition, the LED 320 may serve to illuminate the items for viewing. In still further embodiments, the camera may include circuitry to allow for imaging without the use of visible light.

The circuit board 310 may further include control circuitry 330 which can be used to control the camera and LED, and communicate with the circuitry in the electrical enclosure 210 in various embodiments. The processing of data may be split between such circuitry in various embodiments, or only one set of circuitry may perform all the functions. In still further embodiments, one or more sensors, such as temperatures sensor 335 may be included on the circuitry board 310.

Figure 4:
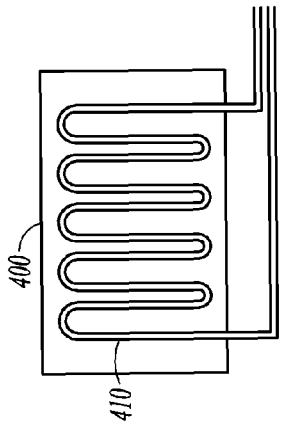
FIG. 4 is a block schematic diagram of an example heater.

FIG. 4 is a block schematic diagram of an example heater 400 that may be used to provide a clear field of view for the lens of the camera. The heater may include a substrate having fine resistive heating wires to provide heat when powered via circuitry. The substrate may be adhesive, with the wires on or embedded, similar to add on rear windshield heaters for automobiles. The heater 400 be positioned proximate the lens of the camera or in the field of view of the lens on or embedded within the transparent camera enclosure 325. The heater may be positioned outside the field of view on the camera enclosure 325 if it provides sufficient heat to create a clear field of view when images are obtained.

Figure 5:
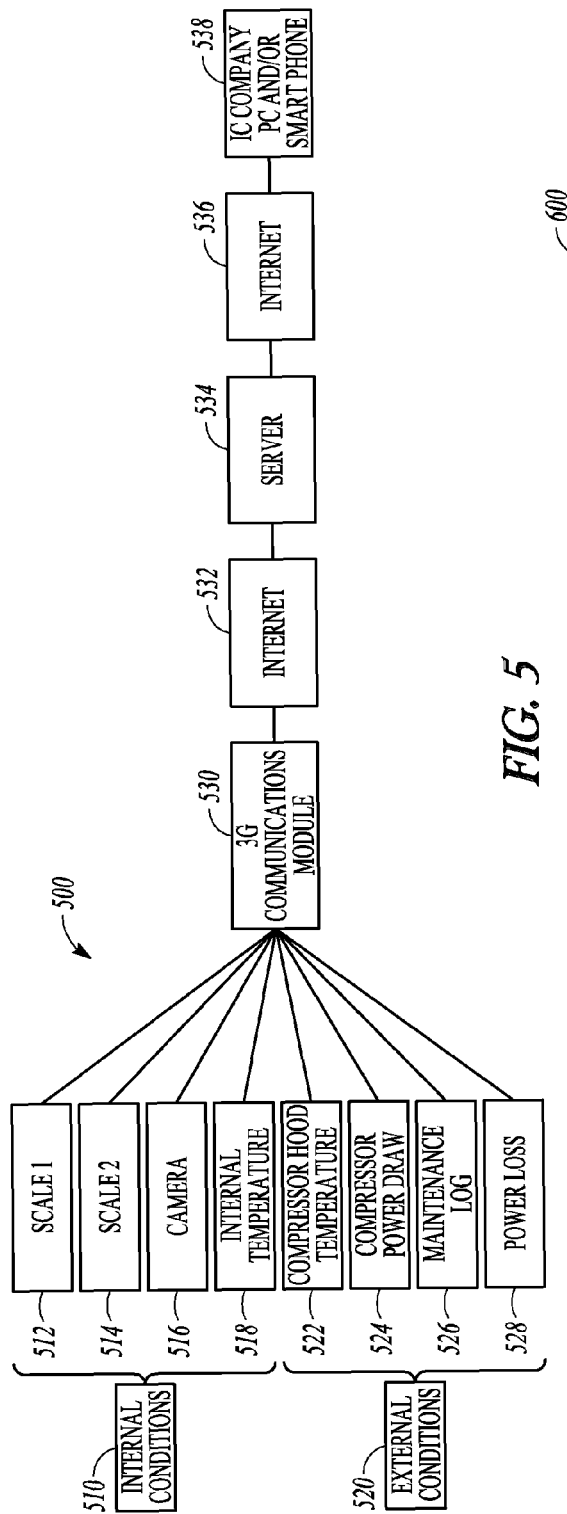
FIG. 5 is a block flow diagram illustrating functions performed in accordance with an example embodiment.

FIG. 5 is a block flow diagram 500 illustrating sensed parameters and components involved in data flow in various embodiments. Internal conditions 510 represent conditions inside of the ice merchandiser 110 in one embodiment. Internal conditions may include measurements from two scales at 512 and 514, the camera 516, and internal temperature 518. External conditions 520 may include compressor enclosure or hood temperature 522, compressor power draw 524, a maintenance log 526, and power loss indications 528.

The information collected corresponding to these conditions is then communicated via the communications module 215 at 530. The module 215 may be a 3 G, 4 G, WIFI, or other type of wireless communications module in various embodiments that is coupled to the internet represented at 532. The information is then provided to server 534, and back via a network 536, such as the internet, to a provider of the items at 538. The provider 538 may be an ice company in one embodiment responsible for restocking the ice merchandiser. One or more user interfaces may be provided on a personal computer, smart phone, tablet, or other device enabling a person responsible for restocking to determine whether or not an ice merchandiser needs restocking, and with what types of items. The information may distinguish between different sized bags of ice, such as 10 lbs or 20 lbs.

Figure 6:
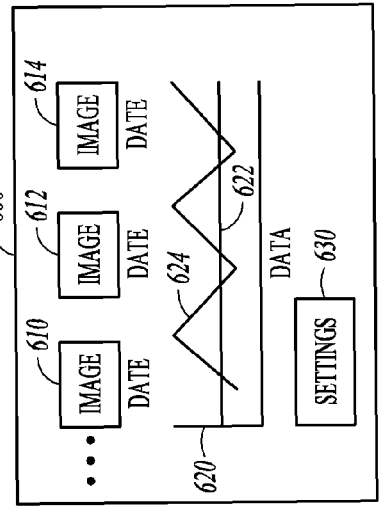
FIG. 6 is an example interface to interact with the system of FIG. 1.

FIG. 6 is an example interface 600 to interact with the system of FIG. 1. In one embodiment, the server 534 processes the information and creates a user interface allowing viewing of the information in various forms. Multiple different parameters may be published and viewable via interface 600. A web type interface, or any number of other media, such as social media, including email and other forms of electronic communication may be used. Still further, the system may provide visible and audio alerts proximate the ice merchandiser.

In example interface 600, images are shown at 610, 612, 614. The images may be thumbnail images that are linked to higher quality images in further embodiments. The newest image is indicated at 614, with prior images available to the left side of the display. In one embodiment, clicking on the latest image may initiate communications back to the system 100 to provide a real time image.

A graph 620 illustrates desired parameters over time. In some embodiments the time frame may be selected by the user in a common manner. Illustrated on graph 620 are internal ice merchandiser temperature 622 and ambient temperature 624, which varies significantly over the few days that are shown. As desired, the internal temperature 622 is fairly constant. Note that a winter environment is like occurring in this representation as the ambient temperature dips below the internal temperature. While temperature is shown on the graph, other parameters may be shown in further embodiments. In addition, a link to multiple settings 630 may be provided to enable the user to change timing of when data is periodically provided, or change any other control points used to control the system 100, including the compressor and fan in some embodiments.

Some example control points and corresponding notes are shown in the following TABLE 1:

TABLE 1

| Product Level | Product Level Measured Within ±5% Product Level Differentiation by Merchandiser Side |
|---|---|
| Compressor Status | Defrost Monitoring and Control Electric Current Draw Monitoring Power Outage Monitoring Compressor Hood Temperature Change Monitoring Maintenance Tracking and Alerts |
| Interior Case Temperature | Temperature Change Monitoring |
| Merchandiser Door Status | Open Door Alarm Set Points |

Figure 7:
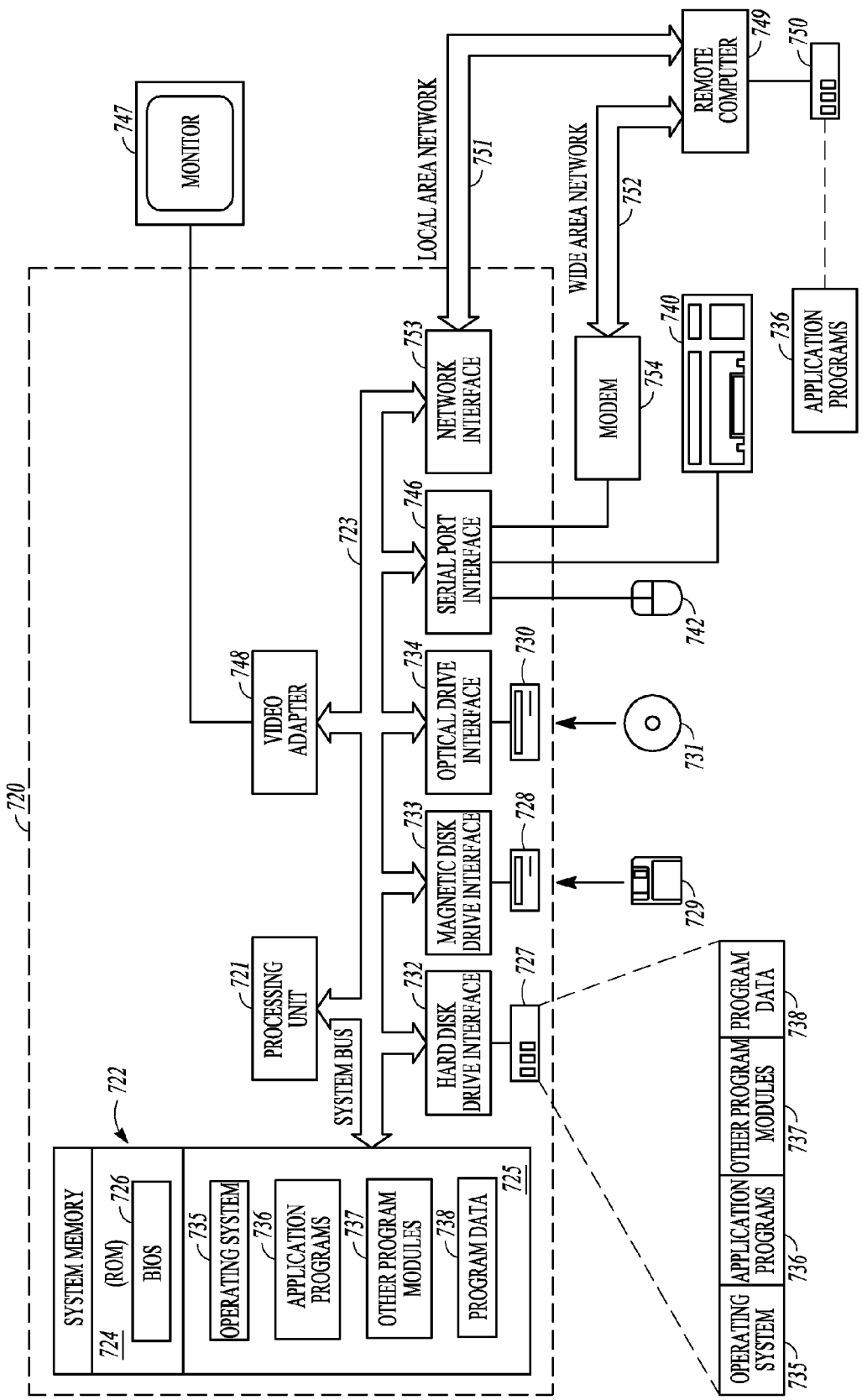
FIG. 7 is a block diagram a system for performing functions and communications according to an example embodiment.

FIG. 7 is a block diagram a system for performing functions and communications according to an example embodiment. FIG. 7 is a block diagram of a computer system or circuitry which may be used to process and publish sensed data and information according to an example embodiment. In the embodiment shown in FIG. 7, a hardware and operating environment is provided that is applicable to any of the circuitry, servers and/or remote clients shown in the other Figures. It should be noted that many devices to provide the functions described herein may be formed with far fewer components than described below. Components may be included or excluded as desired and appropriate for the functions to be provided.

As shown in FIG. 7, one embodiment of the hardware and operating environment includes a general purpose computing device in the form of a computer 700 (e.g., a personal computer, workstation, or server), including one or more processing units 721, a system memory 722, and a system bus 723 that operatively couples various system components including the system memory 722 to the processing unit 721. There may be only one or there may be more than one processing unit 721, such that the processor of computer 700 comprises a single central-processing unit (CPU), or a plurality of processing units, commonly referred to as a multiprocessor or parallel-processor environment. In various embodiments, computer 700 is a conventional computer, a distributed computer, or any other type of computer.

The system bus 723 can be any of several types of bus structures including a memory bus or memory controller, a peripheral bus, and a local bus using any of a variety of bus architectures. The system memory can also be referred to as simply the memory, and, in some embodiments, includes read-only memory (ROM) 724 and random-access memory (RAM) 725. A basic input/output system (BIOS) program 726, containing the basic routines that help to transfer information between elements within the computer 700, such as during start-up, may be stored in ROM 724. The computer 700 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 couple with a hard disk drive interface 732, a magnetic disk drive interface 733, and an optical disk drive interface 734, respectively. The drives and their associated computer-readable media provide non volatile storage of computer-readable instructions, data structures, program modules and other data for the computer 700. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 729, optical disk 731, ROM 724, or RAM 725, including an operating system 735, one or more application programs 736, other program modules 737, and program data 738. Programming for implementing one or more processes or method described herein may be resident on any one or number of these computer-readable media.

A user may enter commands and information into computer 700 through input devices such as a keyboard 740 and pointing device 742. Other input devices (not shown) can include a microphone, joystick, game pad, touch screen, mobile phone, mobile pad, satellite dish, scanner, or the like. These other input devices are often connected to the processing unit 721 through a serial port interface 746 that is coupled to the system bus 723, but can be connected by other interfaces, such as a parallel port, game port, wireless, or a universal serial bus (USB). A monitor 747 or other type of display device, including a touch screen, can also be connected to the system bus 723 via an interface, such as a video adapter 748. The monitor 747 can display a graphical user interface for the user. In addition to the monitor 747, computers typically include other peripheral output devices (not shown), such as speakers and printers.

The computer 700 may operate in a networked environment using logical connections to one or more remote computers or servers, such as remote computer 749. These logical connections are achieved by a communication device coupled to or a part of the computer 700; the invention is not limited to a particular type of communications device. The remote computer 749 can be another computer, a server, a router, a network PC, a client, a peer device or other common network node, and typically includes many or all of the elements described above I/O relative to the computer 700, although only a memory storage device 750 has been illustrated. The logical connections depicted in FIG. 7 include a local area network (LAN) 751 and/or a wide area network (WAN) 752. Such networking environments are commonplace in office networks, enterprise-wide computer networks, intranets and the internet, which are all types of networks.

When used in a LAN-networking environment, the computer 700 is connected to the LAN 751 through a network interface or adapter 753, which is one type of communications device. In some embodiments, when used in a WAN-networking environment, the computer 700 typically includes a modem 754 (another type of communications device) or any other type of communications device, e.g., a wireless transceiver, for establishing communications over the wide-area network 752, such as the internet. The modem 754, which may be internal or external, is connected to the system bus 723 via the serial port interface 746. In a networked environment, program modules depicted relative to the computer 700 can be stored in the remote memory storage device 750 of remote computer, or server 749. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

On the upper left part of the above picture is a signal conditioner that takes voltage signals entering the system on the lower part of the picture and converts them to a zero to five volt range compatible with the web enabled sensor appliance just below it. A model on the upper right couples the server to a wireless network. Wires from the sensors may follow the path of the condenser tubing placed on top of the ice merchandiser, and the entire device may fit inside the container for the condenser and include an antenna on top of the container as shown.

The invention claimed is:

1. A system for an ice merchandiser having a compressor in a compressor enclosure to cool the ice merchandiser comprises:
    a sensor disposed within the ice merchandiser; and
    a communications component disposed within the compressor enclosure and coupled to the sensor to receive signals from the sensor representative of the amount of ice in the ice merchandiser, wherein the communications component is configured to convert the received signals to a digital format and publish the signals via a network connection.

2. The system of claim 1 wherein the sensor comprises a camera and a heating element proximate a lens of the camera.

3. The system of claim 2 wherein the sensor further comprises a housing surrounding at least the lens of the camera, and wherein the heating element comprises a light emitting diode within the housing.

4. The system of claim 3 wherein the light emitting diode is positioned to heat air within the housing to remove condensation from the lens and to provide light to illuminate an inside of the ice merchandiser.

5. The system of claim 4 and further comprising a controller to turn on the light emitting diode to remove condensation, and to control the camera to provide images while the diode is on.

6. The system of claim 4 wherein the camera and light emitting diode are supported by a circuit board.

7. The system of claim 2 wherein the sensor further comprises a housing surrounding at least the lens of the camera, and wherein the heating element comprises a heating wire configured to facilitate capture of images of the ice merchandiser.

8. The system of claim 2 wherein the camera lens provides at least a 70 degree view of the inside of the ice merchandiser.

9. The system of claim 8 wherein the camera lens is angled to provide a view of an entire floor of the ice merchandiser.

10. The system of claim 1 wherein the communications component comprises a web server and a wireless network connection.

11. A device comprising:
    a weight scale adapted to be placed in an ice merchandiser to substantially cover a desired portion of the floor corresponding to stacked bags of ice; and
    a system to receive signals from the weight scale representative of the weight of the ice bags, convert the signals to digital, and publish the signals via a network connection.

12. The device of claim 11 wherein the system comprises a web server coupled to the weight scale.

13. The device of claim 12 wherein the system is located in a container that includes a compressor for the ice merchandiser.

14. The device of claim 13 and further including a second weight scale adapted to be placed in the ice merchandiser to substantially cover a second desired portion of the floor corresponding to stacked bags of ice.

15. The device of claim 14 wherein the scales are adapted to measure the number of bags of ice on them, wherein different size bags of ice are placed on each scale.

* * * * *